United States Patent [19]

[11] Patent Number: 4,696,049

[45] Date of Patent: Sep. 22, 1987

[54] IMAGE SCANNING PROCESS AND UNIT FOR DETECTING SET FORMS

[75] Inventor: Giorgio Musso, Genoa, Italy

[73] Assignee: Elettronica San Giorgio-Elsag S.p.A., Genova-Sestri, Italy

[21] Appl. No.: 724,244

[22] Filed: Apr. 17, 1985

[30] Foreign Application Priority Data

Apr. 20, 1984 [IT] Italy ................................ 67404 A/84

[51] Int. Cl.$^4$ ............................................. G06K 9/20
[52] U.S. Cl. ........................................ 382/22; 382/48
[58] Field of Search ........................ 382/21, 22, 25, 48

[56] References Cited

U.S. PATENT DOCUMENTS

| | | | |
|---|---|---|---|
| 4,115,803 | 9/1978 | Morton | 382/22 |
| 4,428,077 | 1/1984 | Shimada et al. | 382/22 |
| 4,566,124 | 1/1986 | Yamamoto et al. | 382/21 |

Primary Examiner—David K. Moore
Assistant Examiner—Jacqueline Todd
Attorney, Agent, or Firm—Gifford, Groh, VanOphem, Sheridan, Sprinkle and Dolgorukov

[57] ABSTRACT

Image scanning process for detecting set forms, the main characteristic of the process being that it includes a first stage consisting in analysing signals representing points on the said image, in selecting first points defining areas in which the variation in contrast exceeds a given threshold, and in determining the direction of the tangent line relative to each of the said first points; a second stage consisting in detecting whether, for each of the said first points there exist other first points lying on at least one line having a set length and angle in relation to the direction of the line tangent with the point in question and in projecting onto said tangent line if the direction of the said other point lying on the said line has a second set angle in relation to said tangent line; a third stage consisting in memorizing and accumulating the number of the said projections relative to the said projection points and in extracting the said projection points whose accumulated value exceeds a given number threshold; and a fourth stage consisting in selecting from among the said extracted points those defining the set form.

15 Claims, 9 Drawing Figures

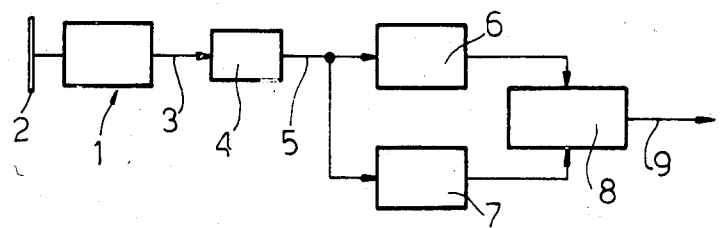
Fig.1
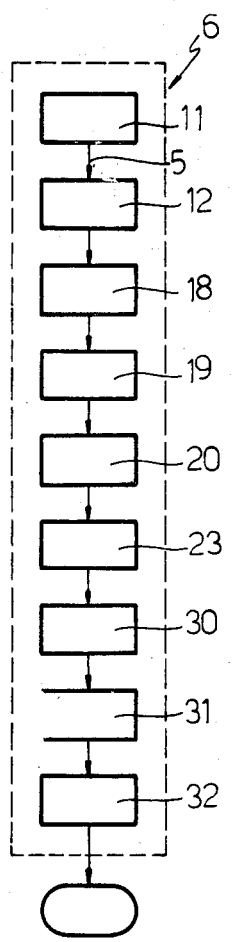
Fig.2
Fig.8
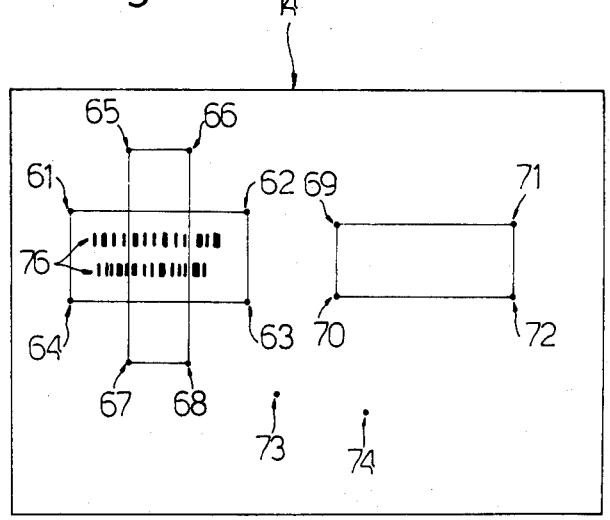

IMAGE SCANNING PROCESS AND UNIT FOR DETECTING SET FORMS

BACKGROUND OF THE INVENTION

The present invention relates to an image scanning process and unit for detecting set forms, said process being applied in particular for detecting address labels, conveniently rectangular in shape, on magazine covers, printed matter, newspapers and other miscellaneous items sent through the mail and the image of which is scanned.

SUMMARY OF THE INVENTION

The aim of the present invention is to provide for detecting and identifying preset forms on a scanned image, regardless of the position or scale of the said form, thus enabling application of the said process for detecting address labels on the covers of miscellaneous items sent through the mail or similar, and without confusing the said forms with similar images on the cover itself, thus enabling employment of the said process on automatic mail sorting systems and equipment in general.

With this aim in view, the present invention relates to an image scanning process for detecting set forms, characterised by the fact that it comprises a first stage consisting of analysing signals representing points on the said image, in selecting first points defining areas in which the variation in contrast exceeds a given threshold, and in determining the direction of the tangent line relative to each of the said first points; a second stage consisting in detecting whether, for each of the said first points, there exists other first points lying on at least one line having a set length and angle in relation to the direction of the line tangent with the point in question, and in projecting onto the said tangent line, if the direction of the said other point lying on the said line has a second set angle in relation to the said tangent line; a third stage consisting in memorising and accumulating the number of the said projections relative to the said projection points and in extracting the said projection points the accumulated value of which exceeds a given number threshold; and a fourth stage consisting in selecting from among the said extracted points those defining the said set form.

The present invention also relates to an image scanning unit for detecting set forms, characterised by the fact that it comprises first means for analysing signals representing points on the said image, for selecting first points defining areas in which the variation in contrast exceeds a given threshold, and for determining the direction of the tangent line relative to each of the said first points; second means for detecting whether, for each of the said first points, there exist other first points lying on at least one line having a set length and angle in relation to the direction of the line tangent with the point in question, and for projecting on to the said tangent line, if the direction of the said other point lying on the said line has a second set angle in relation to the said tangent line; third means for memorising and accumulating the number of the said projections relative to the said projection points; fourth means for extracting the said projection points, the accumulated value of which exceeds a given number threshold; and fifth means for selecting from among the said extracted points those defining the said preset form.

BRIEF DESCRIPTION OF THE DRAWINGS

The stages in the said process and a non-limiting example of the relative unit will now be described with reference to the attached drawings in which:

FIG. 1 shows a block diagram of the unit realizing the process according to the present invention;

FIG. 2 shows an operating block diagram of a component block on the FIG. 1 unit;

FIG. 8 shows a final operating example of the process according to the present invention.

DETAILED DESCRIPTION OF THE INVENTION

Number 1 in FIG. 1 indicates a block (of essentially known type) for scanning the surface of an item 2 (conveniently passed in front of the said block 1) the image of which is converted (via optical-electronic conversion means) into signals representing relatively highly defined points (e.g. 8 pixel per mm) on the said image. The said signals 3 are sent to a block 4 for reducing the definition of the said image, e.g. to 1 pixel per mm. Block 3 is also conveniently of known type and may comprise means for determining a light signal for each point on the image, the said light signal depending on the average brightness of the surrounding points.

Figure 3:
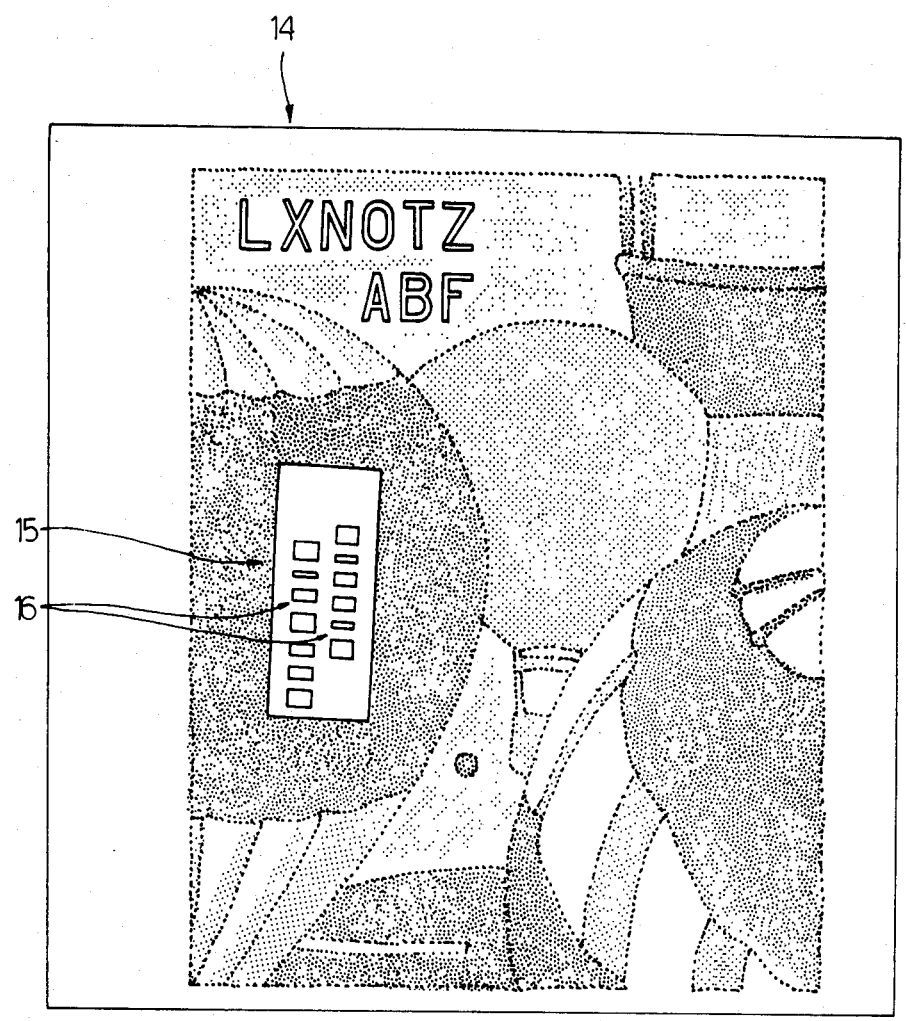
FIGS. 3, 4 and 5 show successive image processing stages according to the process covered by the present invention.
Figure 4:
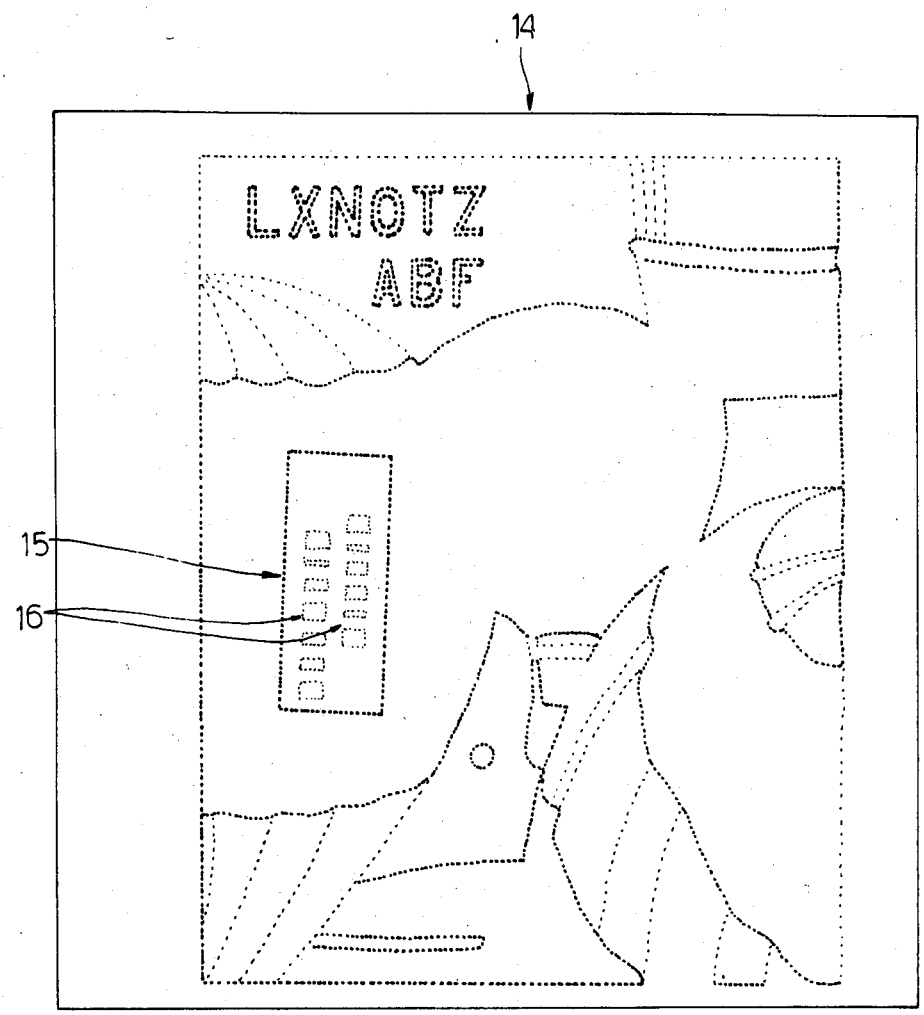
Figure 6:
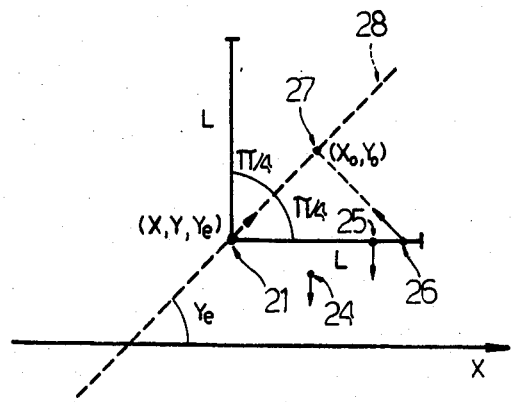
FIGS. 6, 7a and 7b show operating examples of a few stages in the process according to the present invention.
Figures 7A, 7B:
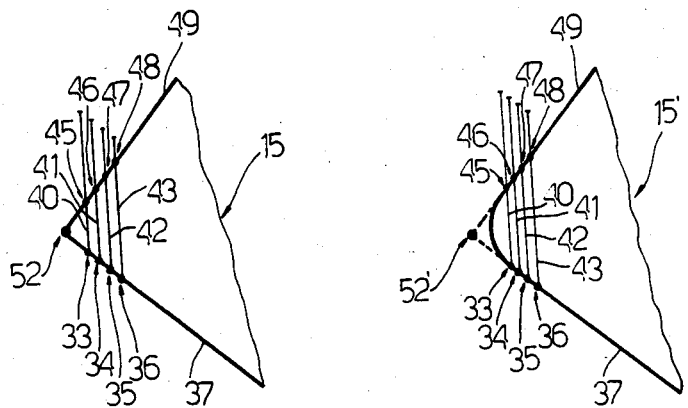

Output signals 5 from block 4 are sent to a processing block 6 (operation of which is shown in more detail in FIG. 2) designed to detect the said set forms on the surface image of item 2. Signals 5 are also sent to block 7 for detecting lines of print on the surface image of item 2. Conveniently, the said block 7 may comprise character-identifying blocks. The output signals from blocks 6 and 7 are sent to the input of processing block 8 (operation of which will be described in more detail later on) designed to make a selection of the set forms identified by block 6 and so supply a final information signal 9. As shown in FIG. 2, via an initial operating block 11, signals 5 representing points (with the definition determined by block 4) on the image of item 2 picked up by block 1 (the said low-definition image is shown in FIG. 3 which shows a cover 14 of item 2, in this case, a magazine bearing miscellaneous print and illustrations and affixed with a rectangular address label 15 bearing lines of print 16) are sent to an edge-detecting block 12 which analyses the said signals 5 and picks out the points defining areas in which the variation in contrast exceeds a set threshold (e.g. in known manner via a 3×3 Sobel operator) so as to obtain the image point configuration shown in FIG. 4. Furthermore, for each of the said points, the direction of the tangent line is also determined. Block 12 goes to block 18 which zero-initiates a first N×N size matrix A, equal to the pixel size of the input image supplied by signals 5. Block 18 goes to block 19 which fills in a second matrix F, the same size N×N as matrix A, by assigning to each edge point (X, Y) selected by block 12 the direction of the tangent line (Ye) in relation to a set axis (x) as shown in FIG. 6. Thus, each edge point (shown in FIG. 4) is identified by its image reference coordinates (X, Y) and by the direction of tangent line (Ye) in relation to axis x. Block 19 goes to block 20 which, for each point detected by block 12 (e.g. point 21 in FIG. 6), determines two lines of length L at ±45° in relation to the direction of the tangent line through the point in question. Block 20 goes to block 23 which, for each edge point, ascertains whether or not there exist other said edge points lying on the line of length L and having a tangent line perpendicular to the tangent line of the point in question. If such exist, the said point on segment L is projected onto the line tangent with the point in question. Assuming, for example, as shown in FIG. 6, that the point being examined is point 21. In this case, point 24 will be disregarded in that it does not lie on segment L; point 25 will be disregarded in that the direction of its tangent line is not perpendicular to line 28 in the direction of the tangent line through point 21; whereas, point 26 will be considered in that it lies on segment L and the direction of its tangent line is perpendicular to line 28. Consequently, it will be projected on to the said line 28 at point 27 of coordinates Xo, Yo. By means of the next block 30, the content of matrix A having coordinates matching the said projection point (in this case 27) is increased by one unit, this process being performed by block 23 for all the edge points detected by block 12 (FIG. 4). In like manner, for each right-angle relative to the said edges, provision is made for accumulating the number of the said projections on a given projection point which thus represents the tip of the said angle, as shown in FIG. 7A, which shows an edge portion of label 15. As shown, the sequence of points 33, 34, 35, 36 ... lying on edge line 37 present corresponding segments 40, 41, 42, 43 of length L having respective points 45, 46, 47, 48 lying on edge line 49 perpendicular to edge line 37. Consequently, the said points 45, 46, 47 and 48 are all projected onto point 52 representing one of the tips of label 15. FIG. 7B shows the same accumulation of projections relative to a virtual tip 52' on a rounded-edge label 15. In like manner, block 30 accumulates values for points on matrix A corresponding to right-angles on the edges of the image shown in FIG. 4.

Figure 5:
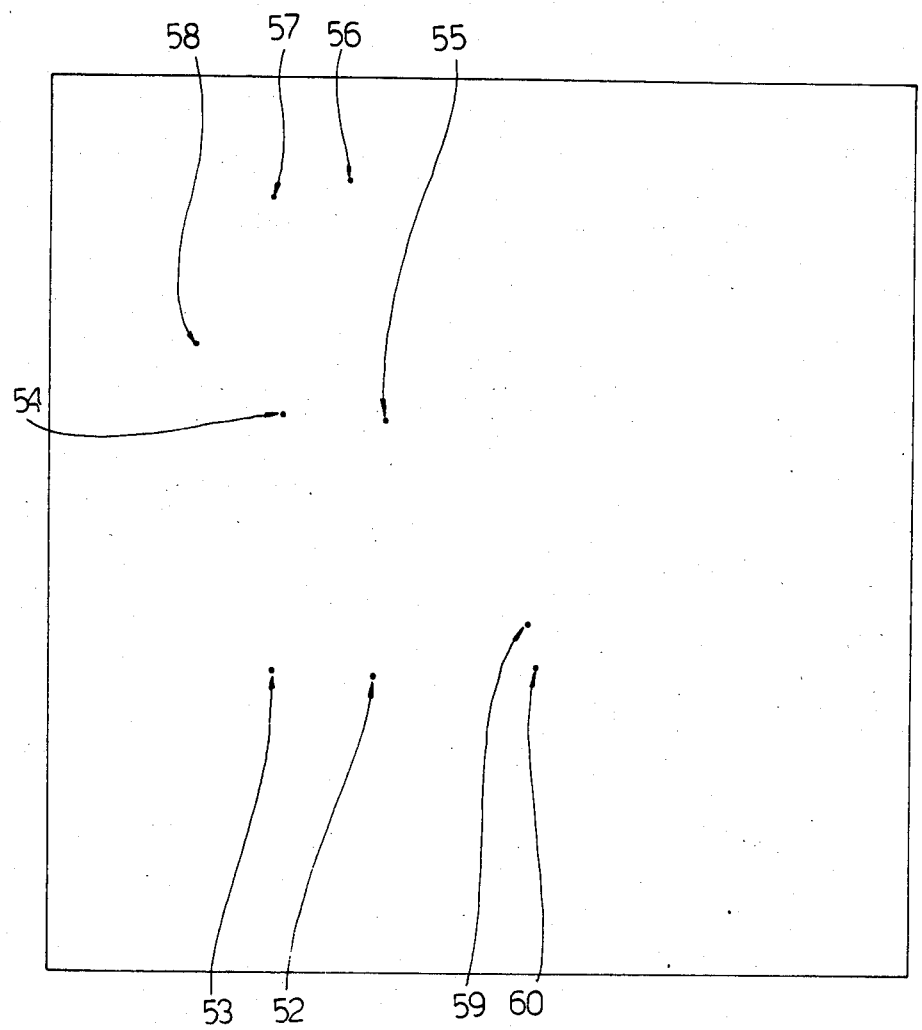

Block 30 goes to block 31 which extracts, from the various point values on matrix A, those points having an accumulated value exceeding a given number threshold and corresponding with tips between relatively long lines. Such points selected by block 31 are numbered 52 to 60 in FIG. 5. Block 31 goes to block 32 which ascertains which of the points detected by block 31 might form part of a given shape having, in this case, four right-angles. In other words, for each of detected points 52 to 60, a check is made to ascertain whether there exists another three correlating points representing tips of a square or rectangle (within a conveniently set range). For example, a check is made to ascertain whether the same distance exists between the tips of parallel sides, the said distance being calculated as the square root of the sum produced by adding the squared differences between the X and Y axes of each point, according to the known equation:

$$(P_1, P_2) = \sqrt{(X_1 - X_2)^2 + (Y_1 - Y_2)^2}.$$

Block 32 also ascertains whether the lines between the detected tip points lie on edge lines detected by block 12. In the FIG. 5 example, therefore, block 32 detects points 52, 53, 54 and 55 as being potential tip points on label 15, which in fact they are.

The data from block 6 identifying label 15 is supplied to block 8 which ascertains, within the space defined by the said label 15, the presence of address lines 16 detected by block 7. If such lines are detected, block 8 confirms acceptance of the detected set form by means of a final signal 9 which may conveniently be processed by subsequent equipment for processing, as required, the said set form identified on item 2.

FIG. 8 shows a cover 14' on which are detected by block 31 a number of right-angles numbered 61 to 74. By means of block 32, the valid set forms are identified as being those defined respectively by tips 61, 62, 63 and 64, 65, 66, 67 and 68 and 69, 70, 71 and 72. Block 32 rejects as a potential set form the one defined by tips 62, 63, 70 and 69, in that no edge lines are detected by block 12 between points 62 and 69 and 63 and 70. As block 7 only detects lines of print 76 in the space defined by tips 61, 62, 63 and 64, only this form is considered valid by the final signal 9 in block 8.

The advantage of the image scanning and set form detecting process, according to the present invention, will be clear from the foregoing description. Firstly, the said form is detected automatically, with a fairly high degree of reliability and little possibility of its being confused with the background to which it is affixed.

Secondly, the said set form is detected regardless of its position or size.

The process, according to the present invention and the relative equipment, may be employed to an advantage for detecting address labels on the surface of miscellaneous items sent through the mail or similar, the said labels usually being affixed to covers presenting various backgrounds. The process according to the present invention provides for detecting the square or rectangular shape of even rounded-edged labels, and for identifying relatively successfully the said label among other similar forms on the covers of magazines, printed matter or newspapers.

To those skilled in the art it will be clear that changes may be made to the process and equipment arrangement described herein without, however, departing from the scope of the present invention.

For example, a number of the selection functions performed by block 32 in FIG. 2 may be performed by block 8 in FIG. 1. Block 20, instead of detecting two segments of length L at ±45° in relation to the direction of the line tangent with the point being examined, may identify only one of the said segments, block 23 thus operating on the edge points of only one of the said segments. Furthermore, the angle of the said segments of length L may be other than ±45°. Likewise, the tangent line through the points lying on the said segments and which are projected onto respective projection accumulating points as described may be assigned a different set angle for detecting set forms having other than right-angled tips.

I claim:

1. Image scanning process for detecting a set form (15) of an image characterised by the fact that it comprises a first stage for analysing signals (5) representing points on said image, for selecting first points (33, 34, 35, 36, 45, 46, 47, 48) defining areas in which the variation in contrast exceeds a given threshold, and for determining the direction (Ye) of a tangent line (37, 49) relative to each of said first points; a second stage for detecting whether, for each of said first points, there exist other first points (45, 46, 47, 48) lying on at least one line (40, 41, 42, 43) having a set length (L) and angle in relation to the direction (Ye) of the line (37) tangent with the point in question (33, 34, 35, 36) and in projecting on to said tangent line (37) projection points if the direction of the said other first point (45, 46, 47, 48) lying on the said line (L) has a second set angle in relation to the said tangent line (37); a third stage for memorising and accumulating the number of the said projections relative to the said projection points and in extracting said projection points (52, 53, 54, 55, 56, 57, 58, 59, 60) the accumulated value of which exceeds a given number threshold; and a fourth stage for selecting from among said extracted points (52, 53, 54, 55, 56, 57, 58, 59, 60) those points (52, 53, 54, 55) defining said set form (15) wherein said signals (5) representing points on the said image are supplied by scanning the surface of an item (2) and by means of optical-electronic conversion.

2. Process according to claim 1, characterised by the fact that, in said fourth stage, for each of said extracted points (52, 53, 54, 55, 56, 57, 58, 59, 60), provision is made for detecting a possible combination with a set number of other extracted points for detecting said set form (15).

3. Process according to claim 2, characterised by the fact that, in the said fourth stage, for said set form (15), provision is made for detecting whether said first points lie on lines connecting said extracted points.

4. Process according to claim 2, characterised by the fact that, subsequent to the said fourth stage, said set form (15) is examined to ascertain the presence of lines of print (16).

5. Process according to claim 1, characterised by the fact that said line of set length (L) is located at an angle of 45° in relation to the direction (Ye) of the line (28) tangent with the point being examined (21), that said second angle is an angle of 90° and that said set form (15) presents four essentially 90° angles.

6. Process according to claim 1, characterised by the fact that, preliminary to said first stage, providing means for reducing the image.

7. Process according to claim 6, characterised by the fact that said reducing means reduces said image by substantially 1 pixel/mm.

8. Process according to claim 1, characterised by the fact that said set form is a delivery address label (15) affixed to a sheet (2) the image of which is scanned.

9. Process according to claim 8, characterised by the fact that said sheet is the cover (14) of an item (2) sent through the mail.

10. Process according to claim 9, characterised by the fact that said item (2) comprises a magazine, printed matter, a newspaper or parcel.

11. Image scanning unit for detecting set forms according to the process described in claim 1, characterised by the fact that it comprises first means (12) for analysing signals (5) representing points on said image, for selecting first points (33, 34, 35, 36, 45, 46, 47, 48) defining areas in which the variation in contrast exceeds a given threshold, and for determining the direction (Ye) of the tangent line (37, 49) relative to each of said first points; second means (20, 23) for detecting whether, for each of said first points (33, 34, 35, 36, 45, 46, 47, 48) there exist other first points (45, 46, 47, 48) lying on at least one line (40, 41, 42, 43) having a set length (L) and angle in relation to the direction (Ye) of the line (37) tangent with the point in question (33, 34, 35, 36), and for projecting on to the said tangent line (37) if the direction of the said other point (45, 46, 47, 48) lying on the said line (L) has a second set angle in relation to the said tangent line (37); third means (30) for memorising and accumulating the number of said projections relative to said projection points (52); fourth means (31) for extending said projection points (52, 53, 54, 55, 56, 57, 58, 59, 60) the accumulated value of which exceeds a given number threshold; and fifth means (32) for selecting from among said extracted points (52, 53, 54, 55, 56, 57, 58, 59, 60) those (52, 53, 54, 55) defining said set form (15).

12. Unit according to claim 11, characterised by the fact that it comprises means (7) for detecting lines of print (16) in the signals (15) representing points on said image; the output of said means (7) being connected to means (8) for accepting or rejecting said set forms (15) and which receive the output from said fifth selecting means (32).

13. Unit according to claim 11, characterised by the fact that said first (12), second (20, 23), third (30), fourth (31) and fifth (32) means comprise a computer.

14. Unit according to claim 1, characterised by the fact that it comprises detecting means (1) for scanning the surface of an item (2), for optical-electronic conversion and for supplying said signals (3, 5) representing points on the said image.

15. Unit according to claim 14, characterised by the fact that it comprises means connected to said first means (12) for receiving said signals (3) representing points on the said image and for reducing the image represented by said signals (3).

* * * * *